United States Patent
Grobelny (10) Patent No.: US 10,116,728 B2
(45) Date of Patent: Oct. 30, 2018

(54) SYSTEM AND METHOD FOR TRANSFERRING DATA USING A DIRECTIONAL TOUCH GESTURE

(71) Applicant: Dell Products, LP, Round Rock, TX (US)

(72) Inventor: Nicholas D. Grobelny, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 681 days.

(21) Appl. No.: 14/178,725

(22) Filed: Feb. 12, 2014

(65) Prior Publication Data

US 2015/0229697 A1 Aug. 13, 2015

(51) Int. Cl.
*H04L 29/08* (2006.01)
*G06F 3/0481* (2013.01)
*G06F 3/0484* (2013.01)
*G06F 3/0488* (2013.01)

(52) U.S. Cl.
CPC ............ *H04L 67/06* (2013.01); *G06F 3/0488* (2013.01); *G06F 3/04817* (2013.01); *G06F 3/04842* (2013.01)

(58) Field of Classification Search
CPC .. G06F 3/017; G06F 17/30165; G06F 1/1698; G06F 3/04817; G06F 3/0488; G06F 17/3015; G06F 3/04842; H04L 67/06; H04M 2250/64; H04N 17/18
USPC ................................................ 715/748, 863
See application file for complete search history.

(56) References Cited

U.S. PATENT DOCUMENTS

| | | | | |
|---|---|---|---|---|
| 8,447,070 | B1* | 5/2013 | Bozarth | H04N 7/18 382/103 |
| 8,464,184 | B1* | 6/2013 | Cook | G06F 1/1694 709/213 |
| 2005/0287998 | A1 | 12/2005 | Tonouchi | |
| 2006/0095234 | A1* | 5/2006 | Brignone | G01C 21/20 702/196 |
| 2009/0160673 | A1* | 6/2009 | Cirker | G07C 9/00111 340/12.22 |
| 2011/0083111 | A1* | 4/2011 | Forutanpour | G06F 1/1694 715/863 |
| 2011/0162048 | A1* | 6/2011 | Bilbrey | H04W 8/005 726/4 |
| 2011/0163944 | A1* | 7/2011 | Bilbrey | G01D 21/02 345/156 |
| 2011/0295978 | A1 | 12/2011 | Pazos et al. | |

(Continued)

*Primary Examiner* — Andrew L Tank
(74) *Attorney, Agent, or Firm* — Larson Newman, LLP (57) ABSTRACT

A method for transferring files between information handling systems is disclosed. The method includes receiving, at an information handling system, a selection of a file, requesting, by the information handling system, nearby information handling systems in response to the selection of the file, and receiving coordinate information and contact information for the nearby information handling system from a server. The method also includes calculating a sector of a room based on the coordinate information for the nearby information handling systems and information about the information handling system, receiving a pass file indicator, and in response to the pass file indicator being aligned with the sector, sending the file to an identified information handling system of the sector.

18 Claims, 5 Drawing Sheets

(56) References Cited

U.S. PATENT DOCUMENTS

| | | | |
|---|---|---|---|
| 2012/0077436 A1* | 3/2012 | Konded | G06F 3/04883 455/41.2 |
| 2013/0125016 A1* | 5/2013 | Pallakoff | G06F 3/04817 715/748 |
| 2013/0169546 A1* | 7/2013 | Thomas | G06F 9/4451 345/173 |
| 2013/0222266 A1* | 8/2013 | Gardenfors | G06F 3/1446 345/173 |
| 2013/0238711 A1 | 9/2013 | Lashkari et al. | |
| 2014/0250388 A1* | 9/2014 | Goncalves | H04W 4/206 715/753 |

* cited by examiner

SYSTEM AND METHOD FOR TRANSFERRING DATA USING A DIRECTIONAL TOUCH GESTURE

FIELD OF THE DISCLOSURE

The present disclosure generally relates to transferring data using a directional touch gesture.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Individuals that are part of a meeting in a conference room may want to share information or files with one another. The individuals in the meeting can do this by sending an email to one another.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
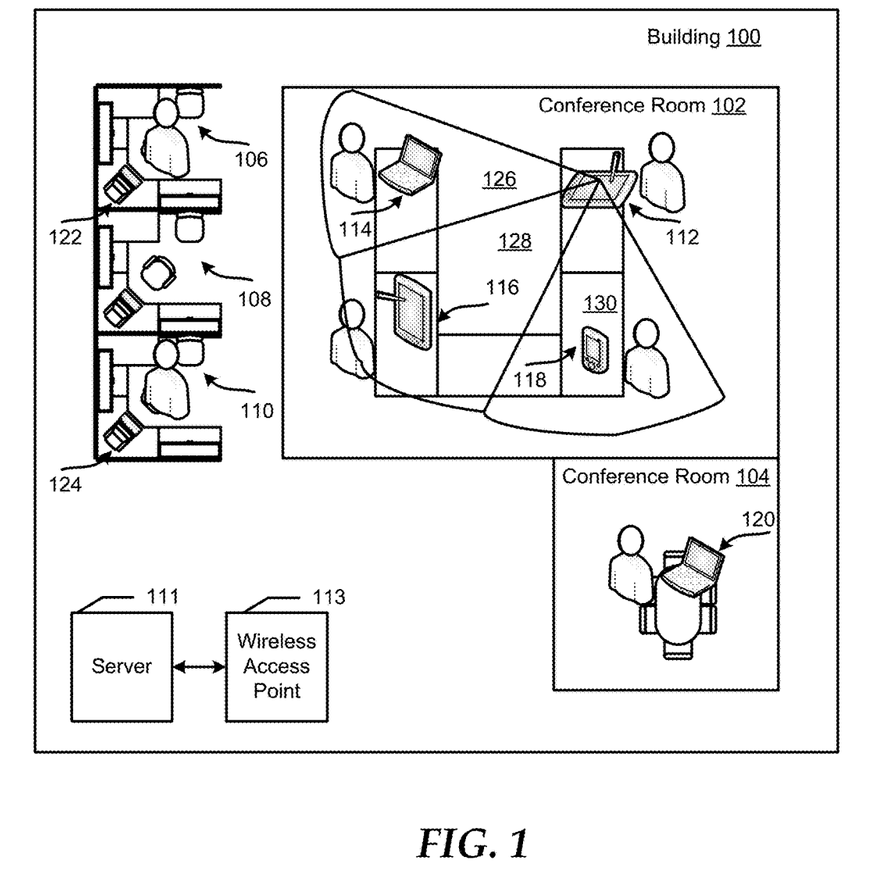
FIG. 1 is a block diagram of a building including multiple information handling systems.

FIG. 1 shows a building 100 that includes a plurality of information handling systems. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Building 100 includes conference rooms 102 and 104, and cubicles 106, 108, and 110. A server 111, a wireless access point 113, and information handling systems 112, 114, 116, 118, 120, 122, and 124 (112-124) can be located in different portions of the building 100. The information handling systems 112-124 can either be in fixed locations, such as when an information handling system is a desktop computer, or can be easily moved around in the building 100, such as when the information handling system is a laptop computer, a mobile device, or the like. The server 111 can communicate with the information handling systems 112-124 via the wireless access point 113. In an embodiment, server 111 can be a location based services server that can be utilized to track the location of the information handling systems 112-124 in the building 100.

A user can store a map of the building 100 including the geographical locations of conference rooms 102 and 104 and cubicles 106-110 in the server 111. The locations of the conference rooms 102 and 104 and cubicles 106-110 can be then mapped using a coordinate system. For example, the building 100 can be divided into an X,Y grid and locations of the conference rooms 102 and 104, and the cubicles 106-110 within the building can be stored using X,Y coordinates. The coordinate information for the conference rooms 102 and 104 and cubicles 106-110 can also be based on the compass direction of the building for example. For example, the southwest corner of the building 100 can have X,Y coordinates (0, 0), the southeast corner can have X,Y coordinates (25, 0), the northwest corner can have X,Y coordinates (0, 25), and the northeast corner can have X,Y coordinates (25, 25). One of ordinary skill in the art would recognize that the coordinates provided herein are merely exemplary, and that the X,Y coordinates can vary without changing the scope of the disclosure. Based on the exemplary coordinate grid, the user can assign X,Y coordinates to the four corners of each of conference rooms 102 and 104 as well as each of the cubicles 106-110. For example, conference room 102 can have the following X,Y coordinates: (7,10), (21,10), (7,22), and (21,22), and conference room 104 can have the following X,Y coordinates: (14,2), (21,2), (14,10), and (21,10).

When the X,Y coordinates of the conference rooms 102 and 104, and cubicle 106-110 are stored, the server 111 can track the movement of the information handling systems 112-124 through the building 100, and can store the room that each of the information handling systems at currently located. The server 111 can determine a current location for each of the information handling systems 112-124 and map the current location to an X,Y coordinate within the building 100. In an embodiment, the server 111 can continually receive global position system (GPS) location data for each of the information handling systems 112-124 and convert the GPS location data into a corresponding X,Y coordinate, or the server can receive location information from multiple wireless access points to triangulate the location of each of the information handling systems.

For example, server 111 can identify the locations of the information handling systems 112-118 in the building 100, and then convert the locations to X,Y coordinates. In an embodiment, the X,Y coordinate for information handling system 112 can be (18,19), the X,Y coordinate for information handling system 114 can be (12,19), the X,Y coordinate for information handling system 116 can be (12,15), and the X,Y coordinate for information handling system 118 can be (18,14). The server 111 can then determine whether each of the information handling systems 112-118 are located within a conference room or cubicle of the building 100. In this embodiment, the server 111 can determine that information systems 112-118 are all located within conference room 102. The server 111 can then perform the same operations to determine that information handling system 120 is located within conference room 104, that information handling system 122 is located within cubicle 106, and the information handling system 124 is located within cubicle 110.

When a user of the information handling system 112 wants to share a file with a user of information handling system 114, the user of information handling system 116, and/or user of the information handling system 118, the information system 112 communicate with the server 111 and request information for nearby information handling systems. Used herein, the term "nearby information handling system" is any information handling system that is located within the same room or cubicle as an information handling system that is making the request, such as conference room 102 for information handling system 112. The server 111 can then provide the information handling system with the contact information, such as email address, medium access control (MAC) address, or the like, and coordinate information for each of the nearby information handling systems.

The information handling system 112 can utilize the coordinate information for the nearby information handling systems 114, 116, and 118 to divide the conference room 102 into different sectors 126, 128, and 130, and associated each of the information handling systems with a corresponding sector. For example, information handling system 112 can associated information system 114 with sector 126, information system 116 with sector 128, and information handling system 118 with sector 130.

The server 111 can track the locations of the information handling systems 112-124, and can associated each of the information handling systems with the particular the room or cubicle, if any, that the information handling systems is located. By limiting the query of nearby information handling to the same room or cubicle as the requesting information handling system, the user of information system 112 can be prevented from accidentally sharing content or files with an unknown user. For example, information handling system 122 is located outside of conference room 102 but in the general direction of sector 126 and information handling system 114. However, the user of information handling system 112 most likely would not want to share content and files with a user that is not known or seen by the user of the information handling system. Thus, the X,Y coordinates of the conference room 102 can be a virtual 'backstop' for content/file sharing, such that when the user of information handling system 112 attempts to share content within sector 126 the content will not be provided to information handling system 122 only but only information handling system 114.

When the user of information handling system 112 wants to share content with user of the information handling system 118, the user can provide a pass file indicator in the direction of sector 130. In an embodiment, a pass file indicator identifies content or a file to be transferred and the sector of a room that the user wants to send the content or file. The user of information handling system 112 can provide a pass file indicator by utilizing a pointing device, the user's finger, or a stylist/pen to select the desired file and 'flick' the file in the direction of the sector that the user wants to transfer the file. The flicking on the file can include sliding or dragging an icon of the file across a display screen in a particular direction. The information handling system 112 can receive the pass file indicator and can identify the information handling system, such as information handling system 118, within the sector associated with the pass file indicator, such as sector 130. The information handling system 112 can then utilize the contact information for the identified information handling system to send the content/file. In an embodiment, the identification information for the information handling system 118 can be an email address associated with the user of that information handling system, such that content/file can be sent as an email attachment.

Figure 2:
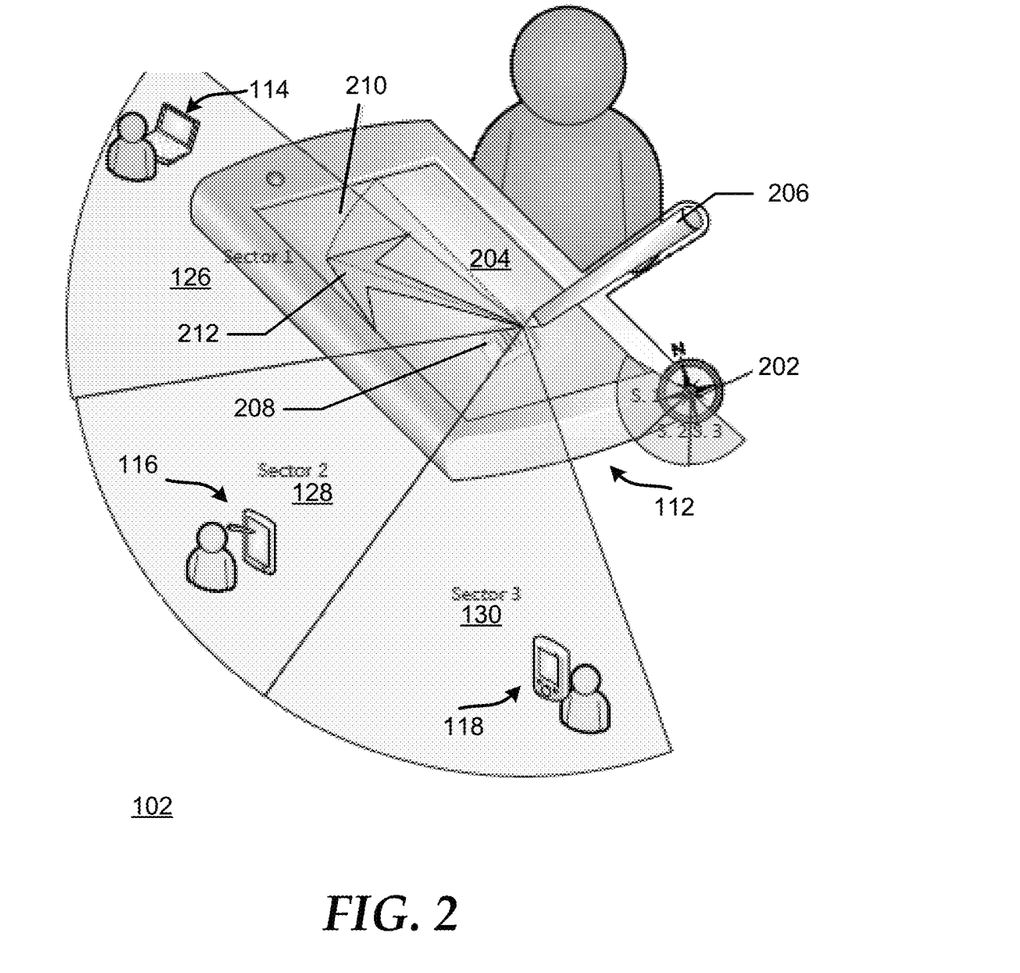
FIG. 2 is an enlarged view of a portion of FIG. 1.

FIG. 2 shows an enlarged view of information handling system 112, and sectors 126, 128, and 130 of conference room 102. The information handling system 112 includes compass sensor 202, display 204, and pen or stylist 206. The display 204 is preferably a touch/capacitive sensitive screen. As described above, the server 111 can continually track and store the locations of the information handling systems 112-124 within the building 100 of FIG. 1. A user of information handling system 112 can utilize the stylist 206 to select a file, such as icon 208 shown on display 204, to send to one of the other information handling systems 114, 116, or 118 in conference room 102. In an embodiment, the user can select file 208 by pressing and holding the icon associated with the stylist 206, with the user's finger, or the like. When information handling system 112 detects a selection of file 208, the information handling system can request the nearby information handling systems from the server 111 of FIG. 1, and can access compass sensor 202 to determine an orientation of the information handling system within conference room 102.

The compass sensor 202 can provide the information handling system 112 with a directional orientation of the information handling system, which the information handling system can use along with the orientation of the conference room 102 to determine a relative orientation of the information handling system within the conference room. The information handling system 112 can also utilize a built-in accelerometer to determine an orientation of the display 204 with respect to a vertical orientation, a horizontal orientation, or some an angle in between vertical and horizontal. The information handling system 112 can utilize the orientation of the display screen 204, the compass information received from compass sensor 202, and the coordinate information from the nearby information handling systems to determine or define the sectors 126, 128, and 130 within conference room 102.

In a particular embodiment, the information handling system 112 can divide the display screen 204 into multiple equal sectors based on the number of nearby information handling systems located in the conference room 102. For example, upon receiving the coordinate information for each of the information handling systems 114, 116, and 118, the information handing system 112 can divide the conference room 102 into sectors 126, 128, and 130. In an embodiment, the size of each of the sectors 126, 128, and 130 can be substantially equal to the other sectors.

The user can then provide the information handling system 112 with a pass file indicator via the stylist 206 or the user's finger. The pass file indicator can result from the user 'flicking or throwing' the file 208 across the display screen 204 in the direction of a desired sector. For example, the user can flick or slide the file 208 within a general location 210 on display screen 204, such as in the direction represented by arrow 212. When the information handling system 112 detects the pass file indicator, based on the file 208 being moved by the stylist 206, in the direction of arrow 212, the information handling system 112 can determine a sector that the arrow is located. In this example, arrow 212 is located within sector 126.

The information handling system 112 can then utilize the coordinate information and contact information received from the server 111 to determine the desired recipient of the file 208, such as the user of information handling system 114. The information handling system 112 can retrieve the contact information, such as an email address, a MAC address, or the like, and transfer the file 208 to the information handling system 114. For example, the information handling system 112 can launch a third-party application, such as a email application, and use the contact information to send the file 208 as an email attachment to the information handling system 114.

In an embodiment, prior to sending the file 208 to the information handling system 114, the information handling system 112 can display a verify recipient notification to the user. This verify notification can be a message displayed on the display screen 204, which can include identification information for the information handling system 114, such as the email address associated with that information handling system, and a message asking if this is the desired recipient of the file 208. The user can then provide a verification of the recipient by selecting an 'OK' button displayed with the message on display screen 204. After receiving the verification from the user, the information handling system 112 can transfer the file 208 to the information handling system 114.

However, if the information handling system 112 determines that the arrow 212 is not located within one of the sectors 126, 128, or 130, the information handling system can provide the user with a message indicating an invalid sector has been identified. Upon receiving this message, the user can attempt to send the file again providing another pass file indicator with the stylist 206. The information handling system 112 can then determine whether the direction of the new pass file indicator is in a valid sector, and if so, can send the file to the desired recipient as described above.

Figure 3:
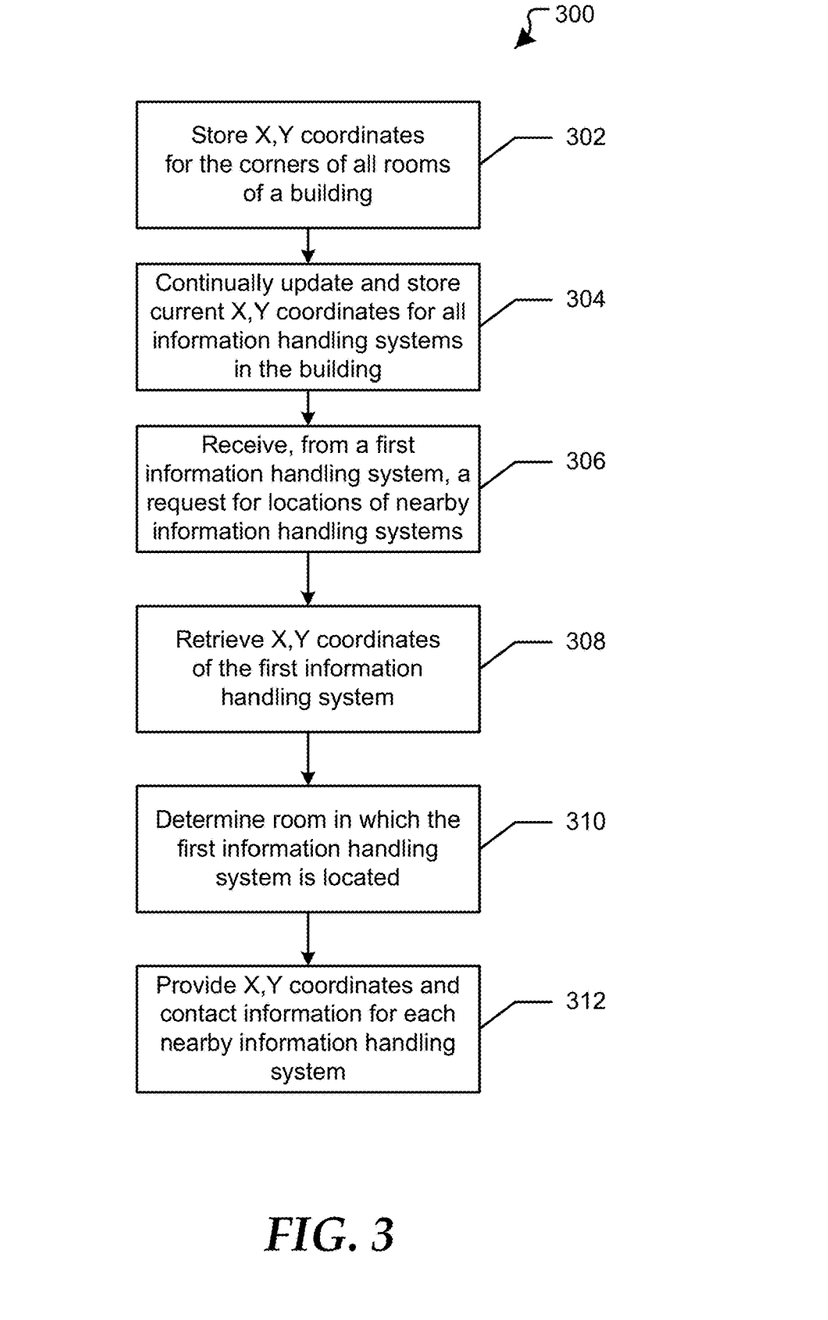
FIG. 3 is a flow diagram of a method for providing coordinate information for file transfer to an information handling system.

FIG. 3 shows a flow diagram of a method 300 for providing coordinate information for file transfer to an information handling system. At block 302, X,Y coordinates for the rooms of a building are stored at a server. In an embodiment, the X,Y coordinates for a room can include X,Y coordinates for each corner of the room. For example, a room can have the following X,Y coordinates: (8, 10), (21, 10), (8, 22), and (21, 22), and another room can have the following X,Y coordinates: (12, 2), (19, 2), (12, 10), and (19, 10). In an embodiment, the coordinate information for the rooms can be based on the compass direction of the building. For example, the southwest corner of the building can have X,Y coordinates of (0, 0), the southeast corner can have X,Y coordinates of (25, 0), the northwest can have X,Y coordinates of (0, 25), and the northeast corner can have X,Y coordinates of (25, 25).

At block 304, the current X,Y coordinates for all information handling systems within the building can continually be updated and stored in the server. In an embodiment, the server can receive global positioning service (GPS) information to determine the location of that information handling system within the building, or can utilize multiple wireless access points that are in communication with an information handling system to triangulate the location of the information handling system. The X,Y coordinates for the information handling system are generated based on the location of the information handling system. A request for locations of nearby information handling systems is received from a first information handling system at block 306. In an embodiment, the request can include identification information of the first information handling system, so that the server can determine the location of the information handling system.

At block 308, the X,Y coordinates of the first information handling system can be retrieved. The coordinate information for the first information handling system can be determined based on the identification information provided in the request. At block 310, a room that the first information handling system is located in is determined. In an embodiment, the server can determine the room based on a lookup table that associated each room with the identification information of the information handling systems located in that room. In another embodiment, the server can use the X,Y coordinates of the first information handling system to determine the coordinates of the room determine the room associated with the first information handling system. At block 312, the server can provide the X,Y coordinates and contact information for each of the nearby information systems to the first information handling system. In an embodiment, the nearby information handling systems are information handling systems located within the same room as the first information handling system. In an embodiment, the server can include a table for each room within the building and that corresponding table can include the coordinate information and contact information for all of the information handling systems currently located within that room. The tables for the different rooms of the building can be continually updated as information handling systems are moved in and out of the rooms of the building.

Figure 4:
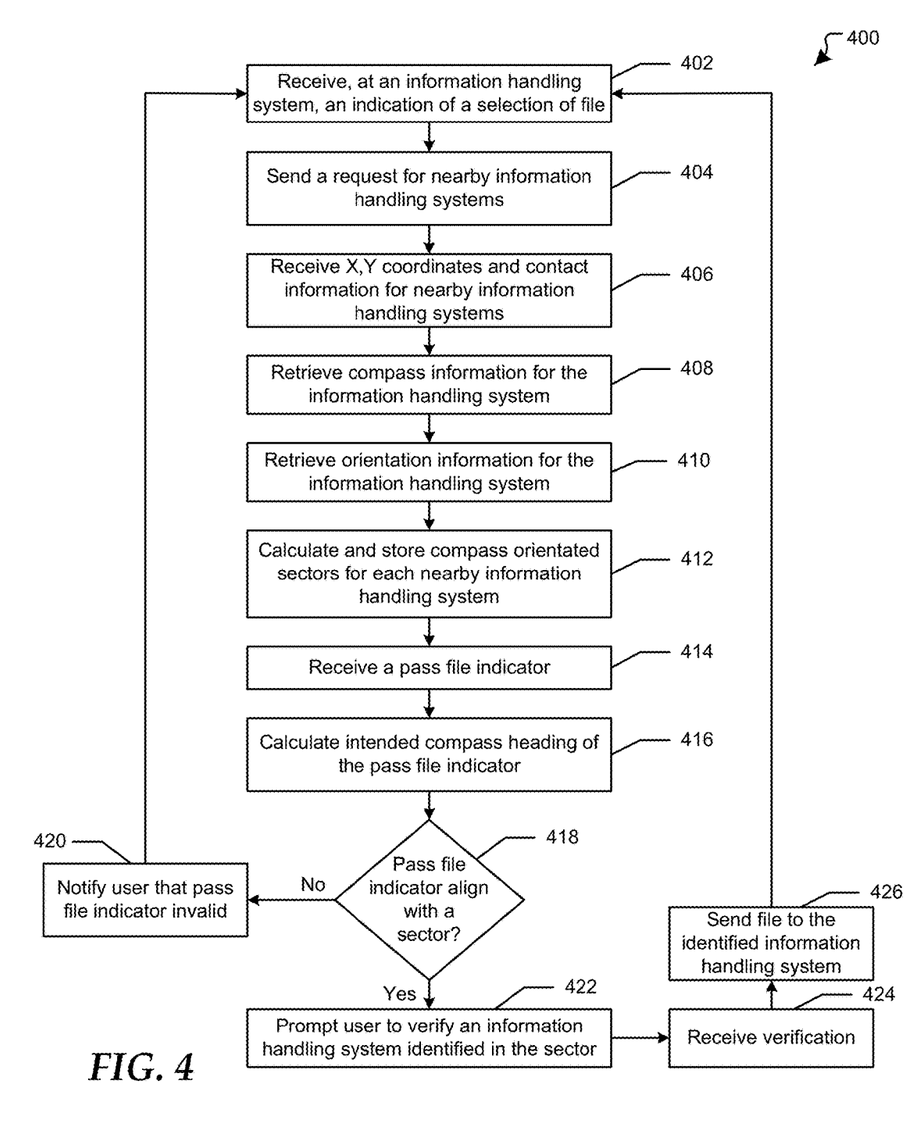
FIG. 4 is a flow diagram of a method for transferring files between two information handling systems.

FIG. 4 shows a flow diagram of a method 400 for transferring files between two information handling systems. At block 402, an information handling system can receive an indication of a selection of a file. The selection of a file can be from a pointing device, a press and hold action on a touch sensitive display screen, or the like. A request for identification of nearby information handling systems can be sent at block 404. In an embodiment, the request can include an identification of the information handling system sending the request. The flow continues with block 406, which corresponds to the flow described above with respect to FIG. 3, and at block 406, the X,Y coordinates and contact information for the nearby information systems is received.

At block 408, compass information for the information handling system can be retrieved. Orientation information for the information handling system can be retrieved at block 410. The orientation information can be received from an accelerometer or the like which can provide information as to whether the display screen of information system is in a horizontal orientation, a vertical orientation, an angle position in between horizontal and vertical, or the like. At block 412, different sectors of a room are calculated and stored for each of the nearby information handling systems. In an embodiment, the different sectors are created based on the orientation and coordinate information of the information handling system, and the coordinate information of each of the nearby information handling systems.

At block 414, a pass file indicator is received. The pass file indicator can be a flick action performed on the touch sensitive display screen. The intended compass heading of the pass file indicator is calculated at block 416. In an embodiment, a compass sensor of the information handling system is utilized to determine the intended compass heading of the pass file indicator. At block 418, a determination is made whether is pass file indicator is aligned within a sector based on the compass heading of the pass file indicator. If the pass file indicator is not aligned with a sector, the user is notified that the pass file indicator is invalid at block 420, and the flow continues as stated above at block 402.

If the pass file indicator is aligned with a sector, a user is prompted to verify an information handling system identified in the sector at block 422. In an embodiment, the verification can be a message identifying an email address associated with the information handling system. At block 424, verification of the intended recipient is received. In an embodiment, the verification can be the user clicking on a soft button labeled 'OK.' The file is sent to the identified information handling system at block 426, and the flow continues as stated above at block 402.

Figure 5:
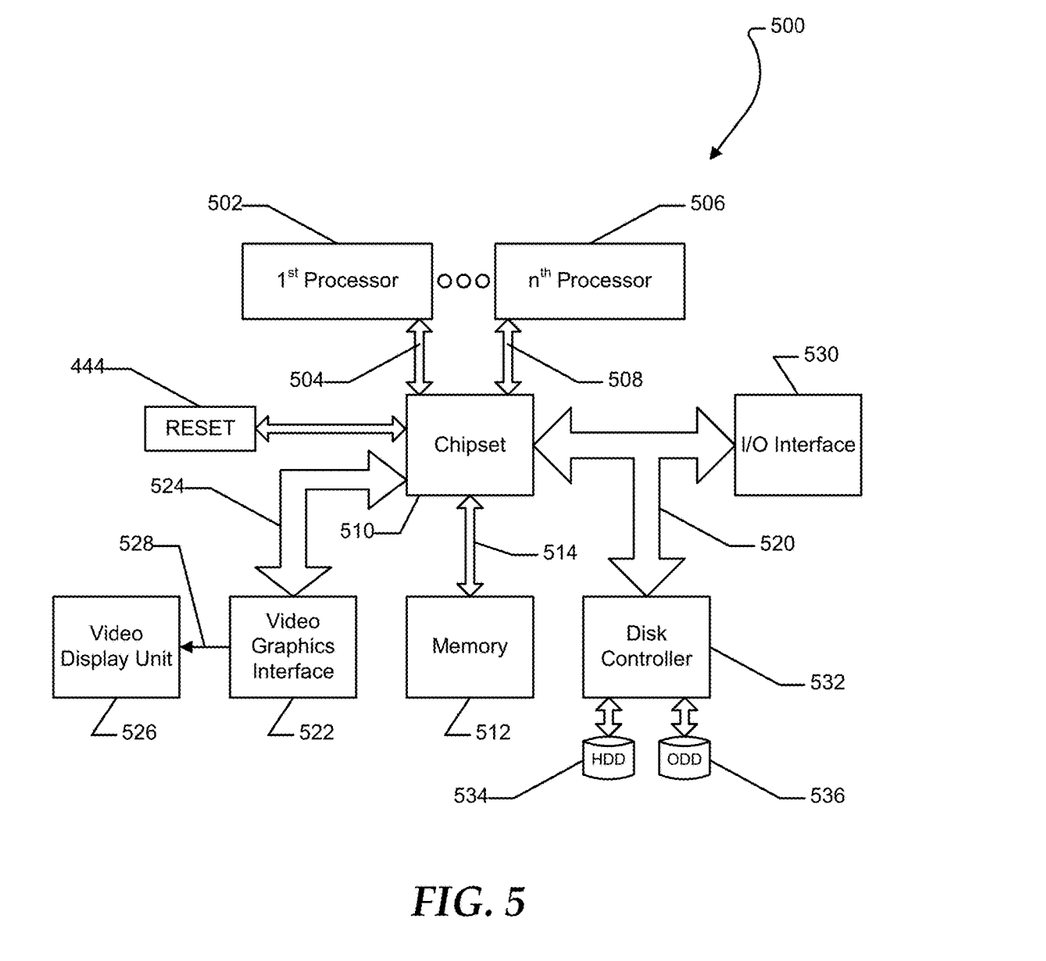
FIG. 5 is a block diagram illustrating an information handling system according to an embodiment of the present disclosure.

FIG. 5 shows an information handling system 500 capable of administering each of the specific embodiments of the present disclosure. The information handling system 500 can represent the user information handling systems 112-124, server 111, or other systems located anywhere within building 100 of FIG. 1. The information handling system 500 may include a processor 502 such as a central processing unit (CPU), a graphics processing unit (GPU), or both. Moreover, the information handling system 500 can include a main memory 504 and a static memory 507 that can communicate with each other via a bus 508. The information handling system 500 includes near-field communications (NFC) device and interface 518, such as an antenna and NFC subsystem. The information handling system 500 can also include a disk drive unit 516, and a network interface device 520. As shown, the information handling system 500 may further include a video display unit 510, such as a liquid crystal display (LCD), an organic light emitting diode (OLED), a flat panel display, a solid state display, or a cathode ray tube (CRT). The video display unit 510 may also act as an input accepting touchscreen inputs. Additionally, the information handling system 500 may include an input device 512, such as a keyboard, or a cursor control device, such as a mouse or touch pad. Information handling system may include a battery system 514. The information handling system 500 can represent a device capable of telecommunications and whose can be share resources, voice communications, and data communications among multiple devices. The information handling system 500 can also represent a server device whose resources can be shared by multiple client devices, or it can represent an individual client device, such as a laptop or tablet personal computer.

The information handling system 500 can include a set of instructions that can be executed to cause the computer system to perform any one or more of the methods or computer based functions disclosed herein. The computer system 500 may operate as a standalone device or may be connected such as using a network, to other computer systems or peripheral devices.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The disk drive unit 516 or static memory 514 may include a computer-readable medium 522 in which one or more sets of instructions 524 such as software can be embedded. The disk drive unit 516 or static memory 514 also contains space for data storage. Further, the instructions 524 may embody one or more of the methods or logic as described herein. In a particular embodiment, the instructions 524 may reside completely, or at least partially, within the main memory 504, the static memory 506, and/or within the processor 502 during execution by the information handling system 500. The main memory 504 and the processor 502 also may include computer-readable media. The network interface device 520 can provide connectivity to a network 526, e.g., a wide area network (WAN), a local area network (LAN), wireless network (IEEE 802), or other network. The network interface 520 may also interface with macrocellular networks including wireless telecommunications networks such as those characterized as 2G, 3G, or 5G or similar wireless telecommunications networks similar to those described above. The network interface 520 may be a wireless adapter having antenna systems 532 for various wireless connectivity and radio frequency subsystems 530 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal; so that a device connected to a network 528 can communicate voice, video or data over the network 528. Further, the instructions 524 may be transmitted or received over the network 528 via the network interface device 520. In a particular embodiment, BIOS/FW code 524 reside in memory 504, and include machine-executable code that is executed by processor 502 to perform various functions of information handling system 500.

Information handling system 500 includes one or more application programs 524, and Basic Input/Output System and Firmware (BIOS/FW) code 524. BIOS/FW code 524 functions to initialize information handling system 500 on power up, to launch an operating system, and to manage input and output interactions between the operating system and the other elements of information handling system 500.

In another embodiment (not illustrated), application programs and BIOS/FW code reside in another storage medium of information handling system 500. For example, application programs and BIOS/FW code can reside in drive 516, in a ROM (not illustrated) associated with information handling system 500, in an option-ROM (not illustrated) associated with various devices of information handling system 500, in storage system 507, in a storage system (not illustrated) associated with network channel 520, in another storage medium of information handling system 500, or a combination thereof. Application programs 524 and BIOS/FW code 524 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
receiving, at an information handling system, a selection of a file;
requesting, by the information handling system, nearby information handling systems in response to the selection of the file;
receiving coordinate information and contact information for the nearby information handling systems from a server, wherein the nearby information handling systems are limited to information handling systems located within a same room of a building as the information handling system based on X, Y coordinates of the room creating a virtual backstop to prevent a file from being passed beyond the X, Y coordinates of the room, and the coordinate information includes X, Y coordinates of the nearby information handling systems within the room, wherein the nearby information handling systems include first, second, and third information handling systems, wherein the server includes a processor to store a map of the building in a memory of the server, to map locations of rooms within the building using a coordinate system and the map of the building, and to store the locations of the rooms on the map in the memory;
dividing the room into a plurality of sectors based on the coordinate information for each of the first, second, and third information handling systems and information about the information handling system, wherein a size of each of the sectors of the room is equal to a size of the other sectors of the room, wherein a first sector is defined to include the first information handling system, a second sector is defined to include the second information handling system, and a third sector is defined to include the third information handling system;
receiving a pass file indicator including a flick action; and
in response to the pass file indicator being aligned with the first sector, sending the file to the first information handling system of the first sector.

2. The method of claim 1, further comprising:
in response to the pass file indicator not being aligned with the first sector, notifying a user that the pass file indicator is invalid.

3. The method of claim 1, further comprising:
in response to the pass file indicator being aligned with the first sector, prompting the user to verify the first information handling system of the first sector, and receiving verification of the first information handling system prior to sending the file to the first information handling system.

4. The method of claim 1, further comprising:
calculating an intended compass heading of the pass file indicator; and
determining whether the pass file indicator is aligned within the first sector based on the compass heading of the pass file indicator.

5. The method of claim 1, wherein the selection of the file is a press and hold action on an icon associated with the file on a touch sensitive display screen.

6. The method of claim 1, wherein the request includes information identifying the information handling system.

7. The method of claim 1, wherein the information about the information handling system includes compass information and orientation information for the information handling system.

8. The method of claim 1, wherein the pass file indicator is a directional gesture across a display screen of the information handling system.

9. An information handling system comprising:
a processor; and
a memory including code executable by the processor to:
receive a selection of a file;
request nearby information handling systems in response to the selection of the file;
receive coordinate information and contact information for the nearby information handling system from a server, wherein the nearby information handling systems are limited to information handling systems located within a same room as the information handling system based on X, Y coordinates of the room creating a virtual backstop to prevent a file from being passed beyond the X, Y coordinates of the room, and the coordinate information includes X, Y coordinates of the nearby information handling systems within the room, wherein the nearby information handling systems include first, second, and third information handling systems, wherein the server includes a processor to store a map of the building in a memory of the server, to map locations of rooms within the building using a coordinate system and the map of the building, and to store the locations of the rooms on the map in the memory;
divide the room into a plurality of sectors based on the coordinate information for each of the first, second, and third information handling system and information about the information handling system, wherein a size of each of the sectors of the room is equal to a size of the other sectors of the room, wherein a first sector is defined to include the first information handling system, a second sector is defined to include the second information handling system, and a third sector is defined to include the third information handling system;
receive a pass file indicator including a flick action; and
in response to the pass file indicator being aligned with the first sector, send the file to the first information handling system of the first sector.

10. The information handling system of claim 9, wherein the display screen is a touch sensitive display screen.

11. The information handling system of claim 9, wherein the pass file indicator is a directional gesture across the touch sensitive display screen.

12. The information handling system of claim 9, further comprising code to:
in response to the pass file indicator not being aligned with the first sector, notify a user that the pass file indicator is invalid.

13. The information handling system of claim 9, further comprising code to:
in response to the pass file indicator being aligned with the first sector, prompt the user to verify the first information handling system of the first sector, and receive verification of the first information handling system prior to sending the file to the first information handling system.

14. The information handling system of claim 9, further comprising code to:
calculate an intended compass heading of the pass file indicator; and
determine whether the pass file indicator is aligned within the first sector based on the compass heading of the pass file indicator.

15. The information handling system of claim 9, wherein the selection of the file is a press and hold action on an icon associated with the file on a touch sensitive display screen.

16. The information handling system of claim 9, wherein the request includes information identifying the information handling system.

17. The information handling system of claim 9, wherein the information about the information handling system includes compass information and orientation information for the information handling system.

18. A method comprising:
storing, by a processor of a server, a map of a building in a memory of the server;
mapping, by the processor, locations of rooms within the building using a coordinate system and the map of the building;
storing, by the processor, the locations of the rooms on the map in the memory;
assigning coordinates to each corner of a room;
storing, at the memory of the server, the coordinates for each corner of the room;
continually updating and storing, by the processor, coordinates of a plurality of information handling systems including a first information handling system and nearby information handling systems in the memory;
receiving, from the first information handling system, a request for location of the nearby information handling systems;
determining, at the server, the nearby information handling systems, wherein the nearby information handling systems are limited to information handling systems located within the room with the information handling system based on X, Y coordinates of the room creating a virtual backstop to prevent a file from being passed beyond the X, Y coordinates of the room;
providing, by the server, coordinate information and contact information for the nearby information handling systems, wherein the nearby information handling systems include first, second, and third information handling systems;
dividing the room into a plurality of sectors based on the coordinate information for each of the first, second, and third information handling systems and information about the information handling system, wherein a size of each of the sectors of the room is equal to a size of the other sectors of the room, wherein a first sector is defined to include the first information handling system, a second sector is defined to include the second information handling system, and a third sector is defined to include the third information handling system; and
receiving, by the processor of the first information handling system, a pass file indicator including a flick action.

* * * * *